(No Model.)  2 Sheets—Sheet 1.
W. E. & F. G. BROCKETT.
METALLIC PACKING.
No. 375,258. Patented Dec. 20, 1887.
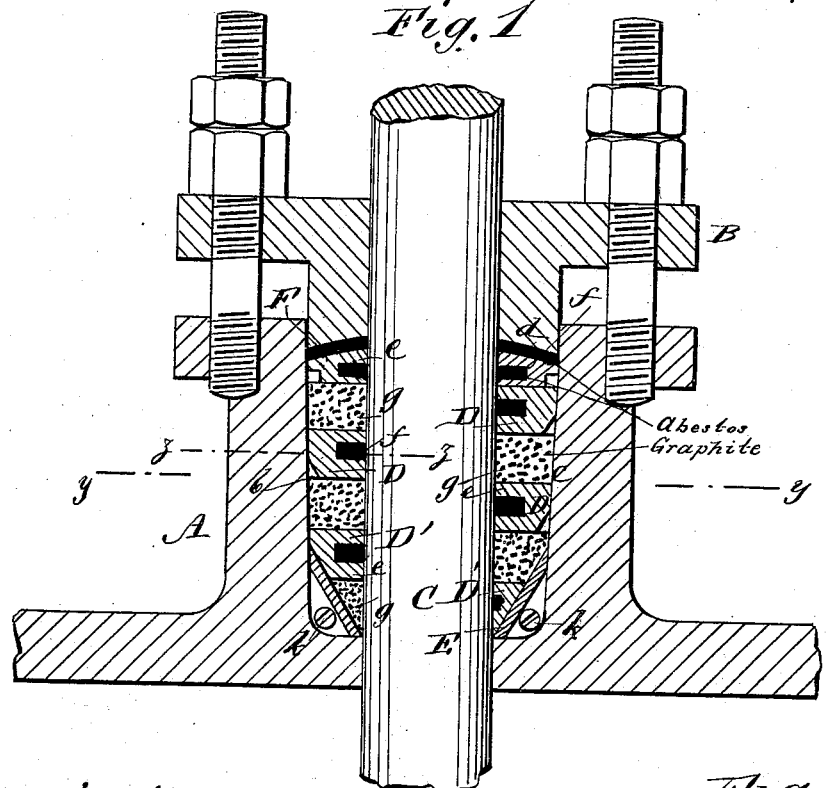
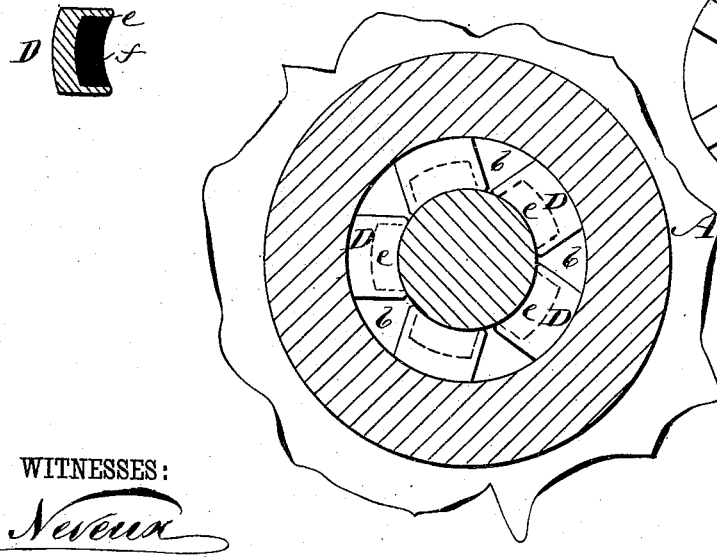
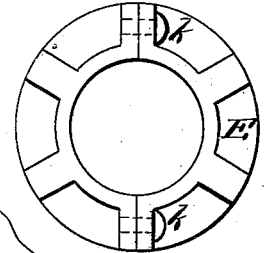
WITNESSES:
C. Neveux
C. Sedgwick
INVENTOR:
W. E. Brockett
F. G. Brockett
BY Munn & Co.
ATTORNEYS.

(No Model.) 2 Sheets—Sheet 2.

W. E. & F. G. BROCKETT.
METALLIC PACKING.

No. 375,258. Patented Dec. 20, 1887.

WITNESSES:
C. Neveux
C. Sedgwick

INVENTOR:
W. E. Brockett
F. G. Brockett
BY Munn & Co.
ATTORNEYS.

UNITED STATES PATENT OFFICE.

WILLIAM E. BROCKETT AND FREDERICK G. BROCKETT, OF PARK CITY, UTAH TERRITORY.

METALLIC PACKING.

SPECIFICATION forming part of Letters Patent No. 375,258, dated December 20, 1887.

Application filed June 4, 1887. Serial No. 240,260. (No model.)

*To all whom it may concern:*

Be it known that we, WILLIAM E. BROCKETT and FREDERICK G. BROCKETT, both of Park City, in the county of Summit and Territory of Utah, have invented a new and useful Improvement in Metallic Packing, of which the following is a full, clear, and exact description.

This invention relates to packing applicable to high and low pressure and compound condensing and other engines, to pumps for hot and cold water, and other mechanical structures, including expansion-joints for pipes and other parts. Its main use, however, is for piston-rods, valve-stems, and other parts to which stuffing-boxes are usually applied; and the invention consists in a novel construction of metallic packing applicable to stuffing-boxes, and in the stuffing-box as a whole, substantially as hereinafter described, and pointed out in the claims.

Reference is to be had to the accompanying drawings, forming a part of this specification, in which similar letters of reference indicate corresponding parts in all the figures.

Figure 5:
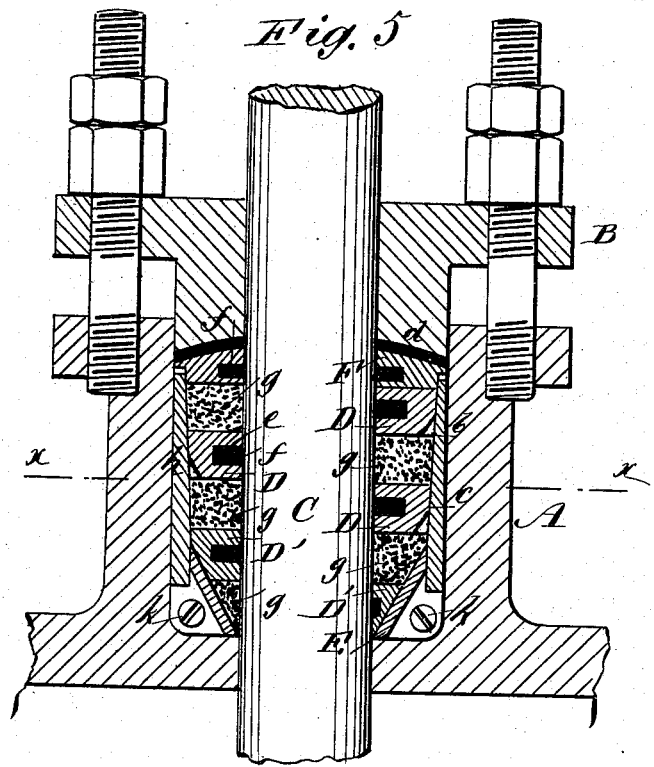
Figure 7:
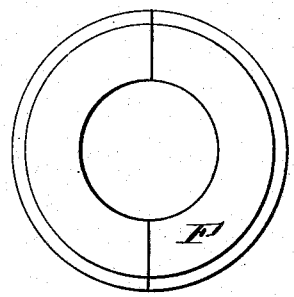
Figure 8:
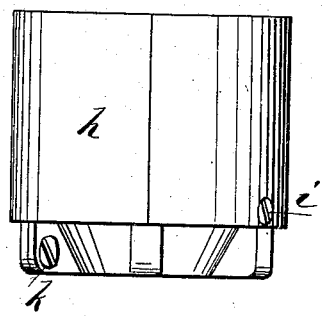
Figure 6:
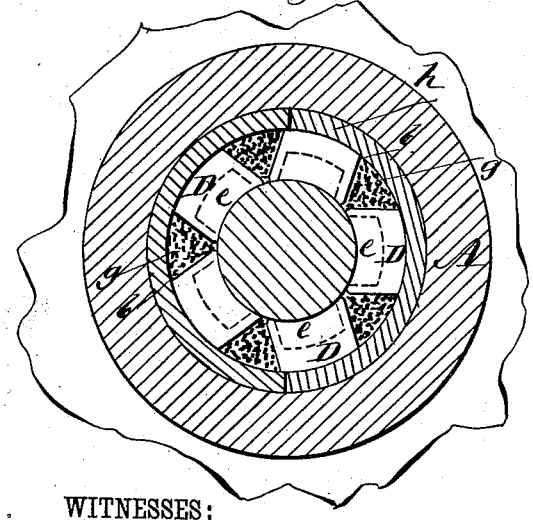
Figure 9:
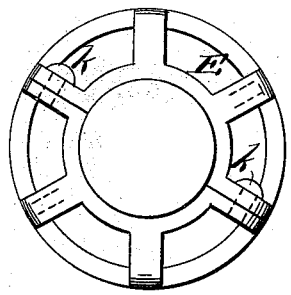

Figure 1 represents a longitudinal section of a stuffing-box embodying our invention, with a piston or other rod, in part, working therethrough. Fig. 2 is a transverse section upon the line *y y* in Fig. 1. Fig. 3 is a view, as seen from its inner face or end, of an inner conical portion of the packing; and Fig. 4 is a section, upon the line *z z* in Fig. 1, of one of the packing-blocks. Fig. 5 is a longitudinal section of an ordinary stuffing-box with our improved packing applied thereto, and showing a piston or other rod, in part, passing through the box. Fig. 6 is a transverse section upon the line *x x* in Fig. 5. Fig. 7 is an inner face or end view of an outer split gland-like ring used in the packing. Fig. 8 is a longitudinal view of a split inner conical sleeve or lining with the inner conical ring or portion of the packing attached; and Fig. 9 is a view, as seen from its inner face or end, of the conical ring or portion of the packing detached.

Referring, in the first instance, to the first four figures of the drawings, A is a stuffing-box, and B its gland, adapted to receive a piston or other rod, C, through them.

The interior of the stuffing-box A is made tapering from its outer toward its inner end to receive the metallic packing within it. Said packing is composed in part of a series of fractional packing-rings, one upon or against the other, composed each of as many detached metallic packing-blocks D D' as will fit snugly around the rod C, leaving an angular space, *b*, between them, and of sloping configuration on their backs to conform—that is, the several outer fractional rings or several outer circular series of detached blocks D—to the interior taper, *c*, of the box A, and the inner fractional ring or circular series of detached blocks D' to conform on their backs to the interior of an inner guide or ring-section, E, of conical configuration on its interior, and of a more acute taper than the interior of the box A, so as to form an obtuse angle therewith, and to meet, or nearly so, on its inner end the rod C.

The several packing-blocks D D' are preferably arranged so that the blocks of the one series break joint with the blocks of an adjacent series.

Upon tightening down the gland B of the stuffing-box the blocks D D' will, by reason of the inner tapering walls of the stuffing-box A and conical interior of the guide or whole ring E, which combined form a tapering inclosure or support for said blocks, be pressed against the rod C, so as to make an approximately close joint. An outer gland-like ring, F, is interposed within the box A, between the outer series of packing-blocks, D, and the gland B, to act as a follower in forcing the packing-blocks D D' to their places, and outside of this follower-ring F, between it and the gland B, may be arranged, if desired, an asbestus or other gasket, *d*, to give additional security against leakage.

The several fractional rings or blocks D D' are constructed with recesses or grooves *e*, as is also, preferably, the follower-ring F, on their inner circumferential sides, which grooves or recesses are filled with asbestus or other lubricant, *f*, to relieve friction on the rod C. This will be found of great advantage in a metallic packing.

By the construction as described of this metallic packing and the shape of the blocks D D' there is no necessity to repack or change the whole packing to meet the exigencies of wear, as the packing-blocks in wearing will be forced through the conical ring or support E, the several series of packing-blocks never being removed, but being used up till fully worn out, and all that is necessary as wear takes place is to remove the follower-ring F and to insert from time to time, as required, another outer fractional ring or set of blocks, D, to keep up the supply. The angular spaces $b$ between the blocks D D' we propose to fill with graphite or black-lead $g$, to lubricate the packing and the rod passing through it.

In Figs. 5, 6, 7, 8, and 9 of the drawings substantially the same construction of packing is shown, but as adapted to an ordinary stuffing-box—that is, a stuffing-box, A, which is of straight cylindrical contour on its interior. This provides for applying the packing to stuffing-boxes now in use. To this end there is inserted within the box A an independent sleeve or lining, $h$, the interior surface, $c$, of which is of tapering form, corresponding with the interior, $c$, of the box A in Fig. 1, and which virtually is the same as the tapering box. This sleeve has attached to it, by screw $i$ or otherwise, the conical ring E, which is suitably constructed to receive the sleeve $h$ partly over it, as shown in Fig. 5.

The conical ring E is divided in direction of its axis and its two sections secured together by screws $k$ or otherwise to hold them in place; also the taper-sleeve $h$ is divided longitudinally and said two pieces fitted together before they are bored and turned, so as to leave no opening when in position in the stuffing-box for the escape of vapor or fluid. This making of the conical ring E in halves, and taper-sleeve $h$, where such is used, also the follower F, as shown in Fig. 7, provides for fitting the packing to its place in the stuffing-box without removing the rod C or detaching any parts or pieces attached to said rod.

While not restricting ourselves to any precise number of packing-blocks D or D' in each fractional ring, we find from experience that five of such blocks adjust themselves most perfectly to the rod working through the packing, and that the angles formed by the blocks at their contact with the rod is less acute and the block at such part is less liable to crumble or break off than if a less number of packing-blocks were used in each fractional ring.

It should here be observed that the stuffing-box A, when combined with the conical ring E, virtually forms a single structure or case of varying tapering construction on its interior, having gradually-sloping sides and a quickly-tapering or funnel-shaped inner end or base for the packing-blocks D D' to slide against and be forced inward and wear, as described.

Having thus described our invention, what we claim as new, and desire to secure by Letters Patent, is—

1. The gland-like packing-ring or follower F, having a lubricant-holding groove, $e$, in its inner peripheral portion, in combination with the fractional packing-rings composed of independent packing-blocks D D', having sloping backs, and grooves or recesses $e$ in their inner surfaces, the lubricating material $f$, and the stuffing-box A, of varying tapering construction on its interior, substantially as described.

2. The combination, with the internally-tapering stuffing-box A and its ring or base E, of the packing-blocks D D', constructed to leave angular spaces $b$ between them, and the lubricating material or packing $g$, substantially as described.

3. The combination, with the stuffing-box A, of the axially-divided ring-follower F, the similarly-divided tapering lining or interior portion $h$ of said box, the correspondingly-divided conical ring E, and the packing-blocks D D', arranged in series between the follower and ring to break joint and form spaces between the blocks of each series for the packing $g$, essentially as specified.

WILLIAM E. BROCKETT.
FREDERICK G. BROCKETT.

Witnesses:
D. C. McLaughlin,
W. V. Rice.